United States Patent [19]
Kvalheim

[11] Patent Number: 6,162,009
[45] Date of Patent: Dec. 19, 2000

[54] ARTICLE DISPENSER AND FEEDER

[75] Inventor: Andrew M. Kvalheim, Petaluma, Calif.

[73] Assignee: Kval, Inc., Petaluma, Calif.

[21] Appl. No.: 09/193,196

[22] Filed: Nov. 17, 1998

[51] Int. Cl.[7] .................................................. B65G 59/06
[52] U.S. Cl. .................... 414/798.1; 221/131; 414/796.4
[58] Field of Search ..................................... 221/131, 238; 414/796.4, 797.4, 798, 798.1; 198/358

[56] References Cited

U.S. PATENT DOCUMENTS

| | | | |
|---|---|---|---|
| 2,674,976 | 4/1954 | Roach .................................. | 414/798 X |
| 3,016,540 | 1/1962 | Taynton .............................. | 414/798 X |
| 4,588,342 | 5/1986 | Hirokawa et al. .................. | 414/797.4 |
| 5,318,194 | 6/1994 | Wiese .................................. | 221/131 X |

FOREIGN PATENT DOCUMENTS

| | | | |
|---|---|---|---|
| 62-116422 | 5/1987 | Japan .................................. | 414/797.4 |

*Primary Examiner*—Janice L. Krizek
*Attorney, Agent, or Firm*—Corwin H. Horton

[57] ABSTRACT

A method and apparatus for dispensing and feeding to a workstation elongated articles which are vertically stackable and have a substantially common longitudinal dimension. Articles of different shape are sequentially dispensed from separate dispensers onto a common pathway and fed to the workstation along that pathway. Articles of each shape are dispensed onto the pathway from a group of articles all having that shape in common and the articles dispensed from all the groups are fed sequentially along the common pathway in a downstream direction to the workstation. The dispensers are arranged in tandem in the pathway direction to the workstation and each is positioned above the pathway and oriented to dispense elongated articles with their longitudinal directions transverse to the pathway direction. The dispensers may be positioned higher than the workstation and the pathway extending under them in the downstream direction to the location of the workstation so that the articles will slide down the pathway to the location of the workstation. A receiver at the end of the pathway receives articles and deposits the articles sequentially in a holder at the workstation extending transversely of the downstream direction of the pathway. The article dispensers have opposed end supports, each for receiving and supporting a respective longitudinal end of elongated articles, which are stacked in a vertical stack on the dispenser, and sequentially dispensing the articles by simultaneously releasing the ends of the bottom article while continuing to support the ends of the articles remaining in the stack.

13 Claims, 10 Drawing Sheets

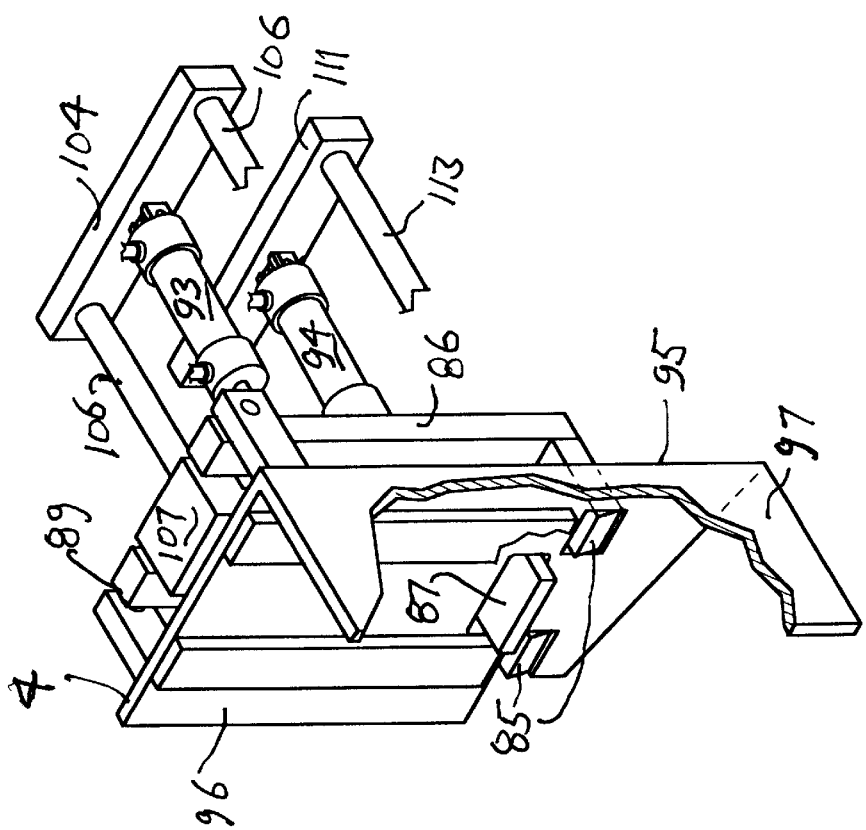
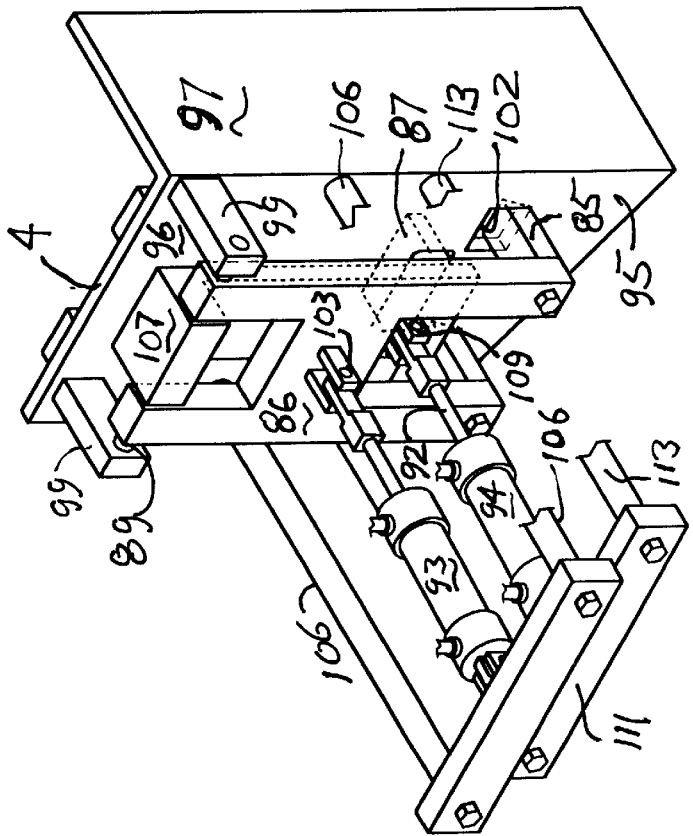
FIG. 6

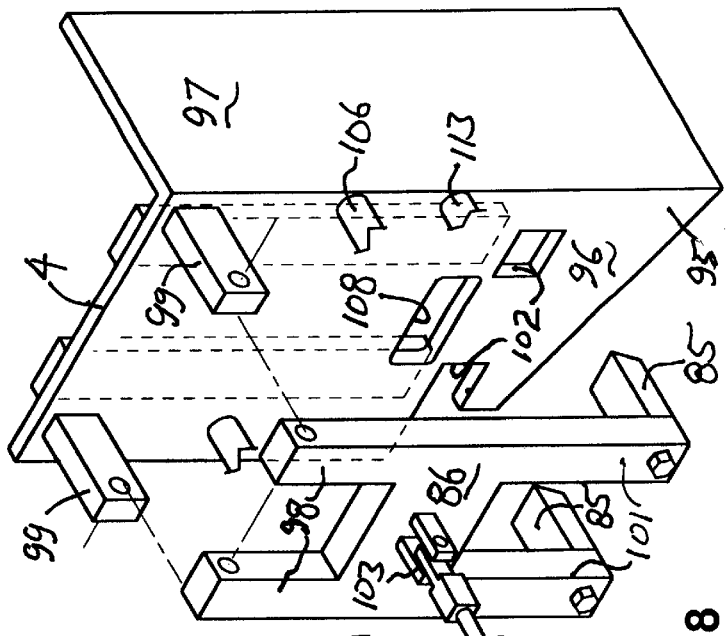

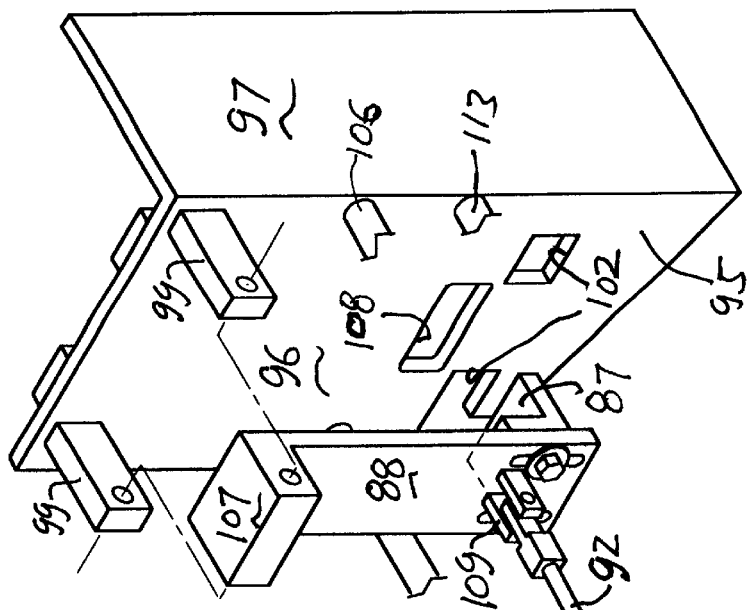
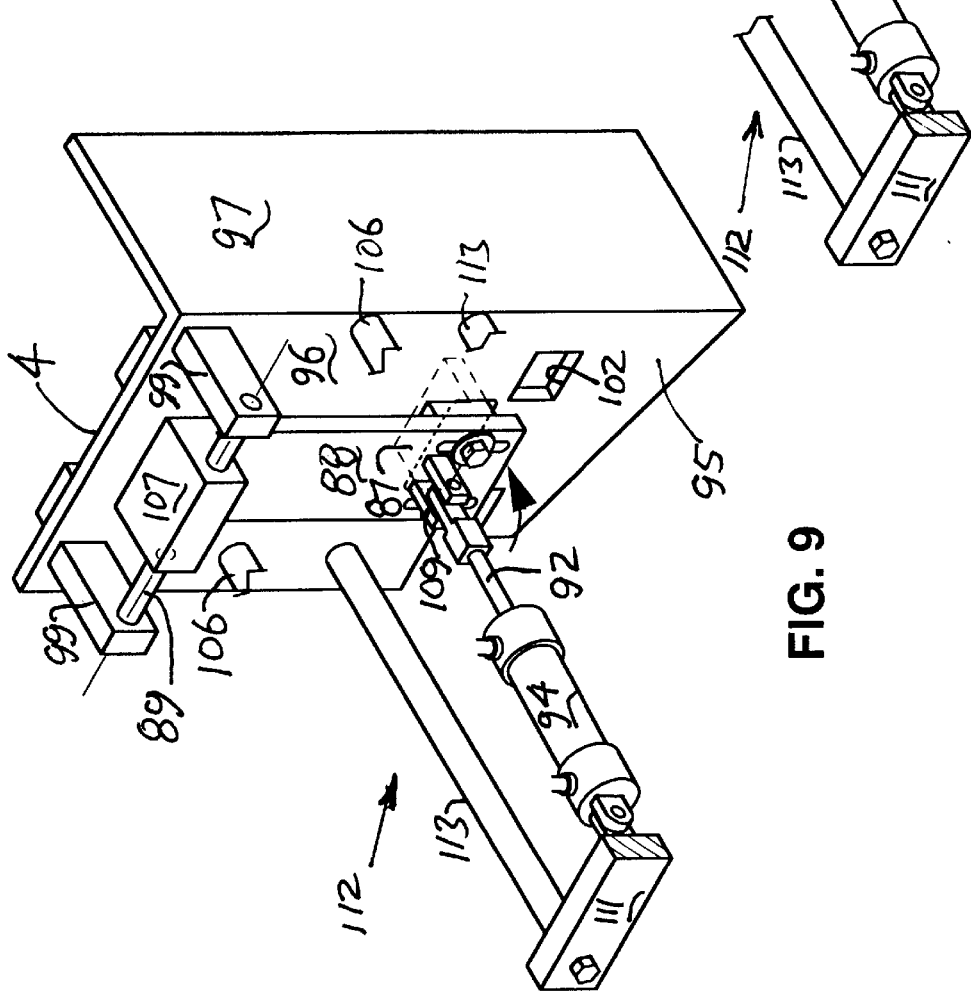
FIG. 10
FIG. 9

ARTICLE DISPENSER AND FEEDER

BACKGROUND OF THE INVENTION

This invention relates to article dispensers and feeders, especially equipment for automatically feeding elongated stackable workpieces or other articles, particularly elongated articles, such as boards, having opposed planar sides in the longitudinal direction and a width across the planar sides transverse to the longitudinal direction that is at least as great as, and typically more than two times greater than, the thickness between the planar sides. These dispensers and feeders are particularly adapted for feeding such articles to a workstation or site where they will undergo assembly or other operations.

Mechanical dispensers and feeders of elongated articles are desirable, particularly for feeding workpieces to a workstation, in order to avoid the expense of additional operators for feeding the articles individually by hand. However, typical mechanical feeders are only capable of moving elongated articles individually from one location to another, without any capability for consecutive feeding to a workstation, selectively, of workpieces of differing configurations or types in a desired order or to feed elongated articles oriented with their longitudinal dimension transverse to the path of travel to a selected lateral placement at the workstation.

For some operations feeding of elongated workpieces to a precise lateral placement at a workstation is essential. Additionally, it may be a requirement that workpieces having a variety of configurations or types be fed selectively and in sequence to the workstation. A typical workstation that would benefit from such a feeding device is described in U.S. Pat. No. 5,222,290 (Patent '290), which concerns a machine for automatically applying hinges to doors and door jambs. As described in Patent '290, the jamb is placed and held in a workstation along side the side edge of the door end for application of hinges connecting the jamb and the door edge by tools mounted on carriages that move longitudinally along the jamb and door edge. It is important that a jamb of appropriate configuration be fed to the workstation for each assembly operation, and particularly a jamb configured for a left side opening door or a jamb configured for a right side opening door. It is also important that jambs be fed to the precise longitudinal location at the workstation for proper assembly with the door and that location may be different for jambs of different configuration, e.g. for a left opening or for a right opening door. Door jambs, the two side members of a door frame, will typically have a recess or notch along one longitudinal side for receiving a door edge and a notch at the top end for mating with the end edge of a horizontal sill extending between the left and right side jambs. The jamb for either a left or right-opening door is placed in the workstation with its notched longitudinal side facing in the direction of the hinge applying equipment. To place a jamb for a left-opening door in the workstation with this orientation of its notched longitudinal side, its notched top will have to be at the opposite end from that for a right-opening door placed in the workstation for this same orientation. Thus, a workstation for assembly of both left and right-opening door and frame units will need to be selectively fed door jambs configured for either left or right-side opening doors and feed them with their tops at opposite ends of the workstation. Also, the left and right-side opening jambs will need to be selectively fed to different longitudinal locations at the workstation in order to carry out the assembly operations, e.g. routing and hinge application by stationary routing and hinge-applying apparatus, at proper locations along the jambs. These positions will be different because the top of the door for a left-opening door will be at the reverse end at the workstation than that for a right-opening door. There is therefore a need for more efficient mechanical dispensing and feeding devices for elongated articles.

SUMMARY OF THE INVENTION

This invention relates to a method and apparatus for dispensing and feeding to a workstation elongated articles which are vertically stackable and have a substantially common longitudinal dimension. It particularly concerns sequentially dispensing from separate dispensers onto a common pathway and feeding to the workstation along that pathway articles of different shape. In this invention articles of each shape are dispensed onto the pathway from a group of articles all having that shape in common and the articles dispensed from all the groups are fed sequentially along the common pathway in a downstream direction to the workstation. The dispensers are arranged in tandem in the pathway direction to the workstation and each is positioned above the pathway and oriented to dispense elongated articles with their longitudinal directions transverse to the pathway direction. Advantageously, the dispensers along the pathway may be positioned higher than the workstation and the pathway extending under them in the downstream direction to the location of the workstation provided with a downward slope steep enough that the articles dispensed onto the pathway from the dispensers will slide by gravity down the pathway to the location of the workstation.

As another feature of this invention, a receiver is provided at the end of the pathway at the workstation location for receiving articles dispensed onto and fed downstream on the pathway and feeding them sequentially from the pathway to the workstation. The receiver may take the form of an extension of the pathway that pivots from an upward receiving position, at which the article is received and retained thereon by a retainer desirably at its downstream margin, and a downward delivering position, at which the article is released from the retainer and deposited in a holder for the article at the workstation extending transversely of the downstream direction of the pathway.

As another feature of this invention an elongated article dispenser is provided that is comprised of opposed end supports, each for receiving and supporting a respective longitudinal end of elongated articles, which are stacked in a vertical stack on the dispenser, and sequentially dispensing the articles by simultaneously releasing the ends of the bottom article while continuing to support the ends of the articles remaining in the stack. Desirably, each end support has a stack guide for maintaining the articles in a vertical stacked condition. Each end support has a bottom article support for supporting the respective end of the bottom article stacked on the dispenser and a support for supporting the respective end of the next from the bottom article stacked on the dispenser. Both the bottom article supports and the next to bottom article supports are each operable between a support position and a release position for releasing their supported article ends to drop therebelow. To dispense an article, the bottom article supports of both end supports are simultaneously operated to release and thereby separately dispense the bottom article to the pathway below while the supports for both ends of the next to the bottom article maintain their support of that article and the articles stacked thereon. The bottom article supports are then returned to their support positions and the supports for the next to bottom article are simultaneously operated to their release positions to drop the next to bottom article to the bottom article position where the ends thereof are now supported by the bottom article supports. The next to bottom end supports may then be operated to support the ends of the next article in the stack, in preparation for the next dispensing cycle.

In yet another feature, the workstation elongated article holder comprises a clamp for securing the article along its elongated direction for work operations to be carried out against a selected longitudinal side of the article in which the clamp has a ram for urging against the longitudinal side of the article opposed to the selected side to secure the article against work forces acting against the selected side. The ram has a yieldable driver, such as one or more pressure-operated pistons, for yieldably urging the ram to its engaged position against the side of the article and a lock for mechanically fixing the ram in the engaged position to resist work forces against the selected side of the article. In this manner the article may be held in place by the ram with a moderate yieldable force, that will avoid damage to the article, and still be held at that position against the work forces by the greater resistance by the mechanical lock.

BRIEF DESCRIPTION OF THE DRAWING

FIG. 6 is a fragmentary view of the jamb feeder shown in FIG. 11 showing the opposed end supports of the upper jamb dispenser;

FIG. 7 is a fragmentary view of the left end support of the upper dispenser of FIG. 11 with portions removed to expose to view the bracket having jamb support catches;

FIG. 8 is an exploded view of the end support shown in FIG. 7;

FIG. 9 is the same fragmentary view of the FIG. 7 end with portions removed to expose to view the bracket having a jamb end-engaging detent;

FIG. 10 is an exploded view of the end support shown in FIG. 9;

DETAILED DESCRIPTION OF THE PREFERRED EMBODIMENT

The following description illustrates the manner in which the principles of the invention are applied but is not to be construed as limiting the scope of the invention.

The article dispensers and feeders are designed to handle one or more series or groups of articles that are stackable in a vertical stack, have a common length dimension and having similar shaped ends in that dimension (desirably transverse to the length dimension and generally planar) and particularly articles which are elongated in that dimension, such as lumber or similar elongated structural elements having planar top and bottom surfaces. The feeders of this invention are particularly useful for collating several elements of different configuration for a workpiece processing or assembly. They are also capable of delivering elements to a work station or the like at specific desired locations in the direction of their longitudinal axis so that they are in proper register at the work station for the desired operations to be carried out on the elements at the workstation. The invention will be illustrated with apparatus of this type and particular apparatus for feeding door jambs to a workstation for applying hinges to the door jambs and the door edge in the manufacture of prefabricated door frames.

Figure 1:
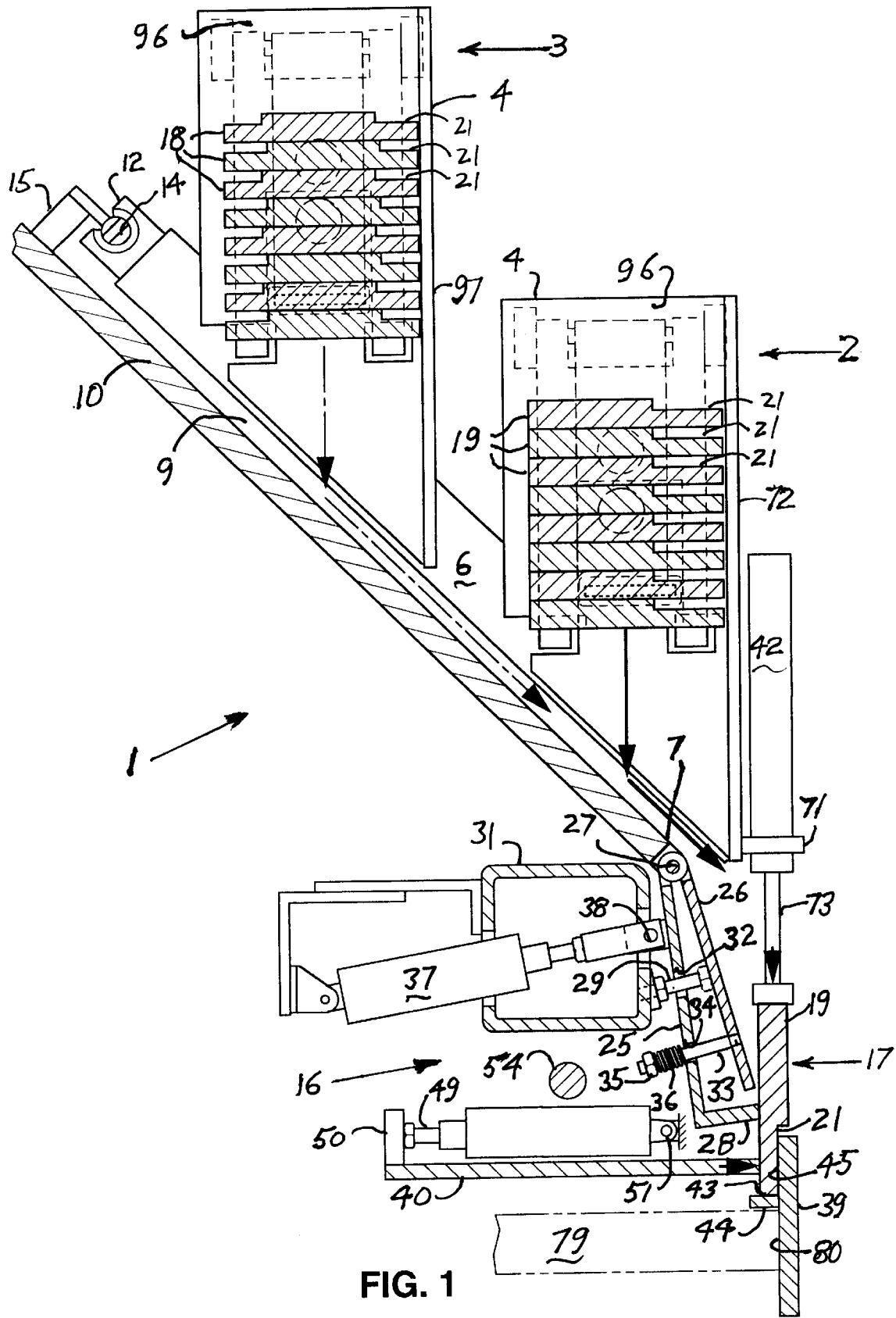
FIG. 1 is a cross-sectional side view of the door jamb feeder and workstation shown in FIG. 11, taken along line 1—1, illustrating the end sections on the right side of the two jamb dispensers stationed in tandem along the feeder pathway and showing a door jamb secured at the workstation.
Figure 2:
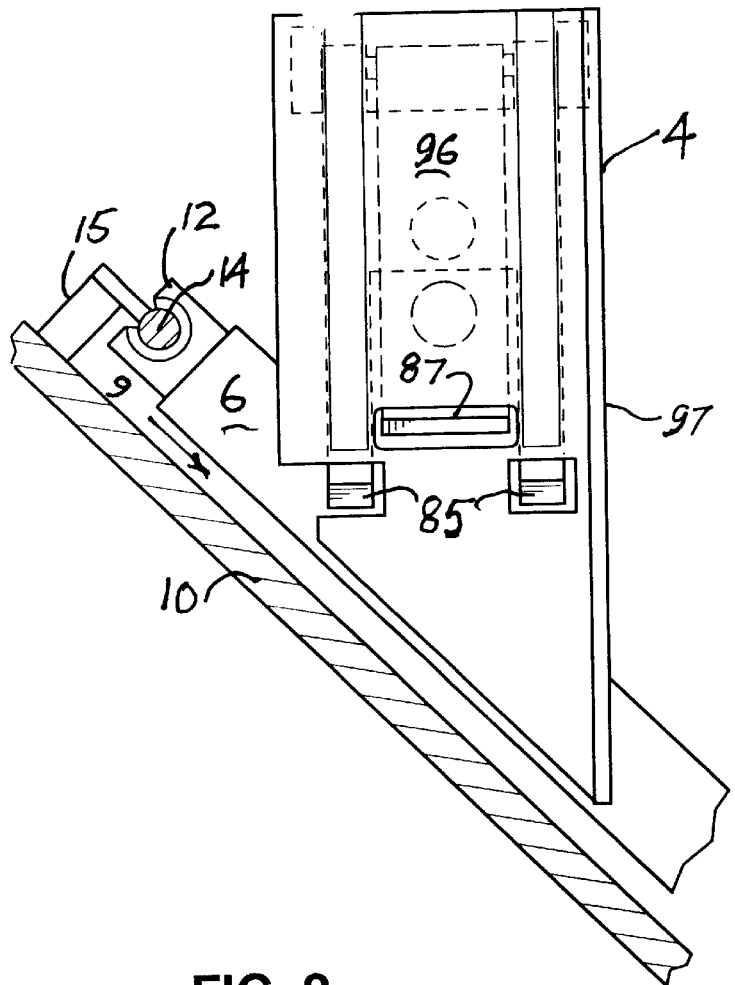
FIG. 2 is a fragmentary view of the upper left portion of FIG. 1 illustrating an end support but without the stack of jambs.
Figure 11:
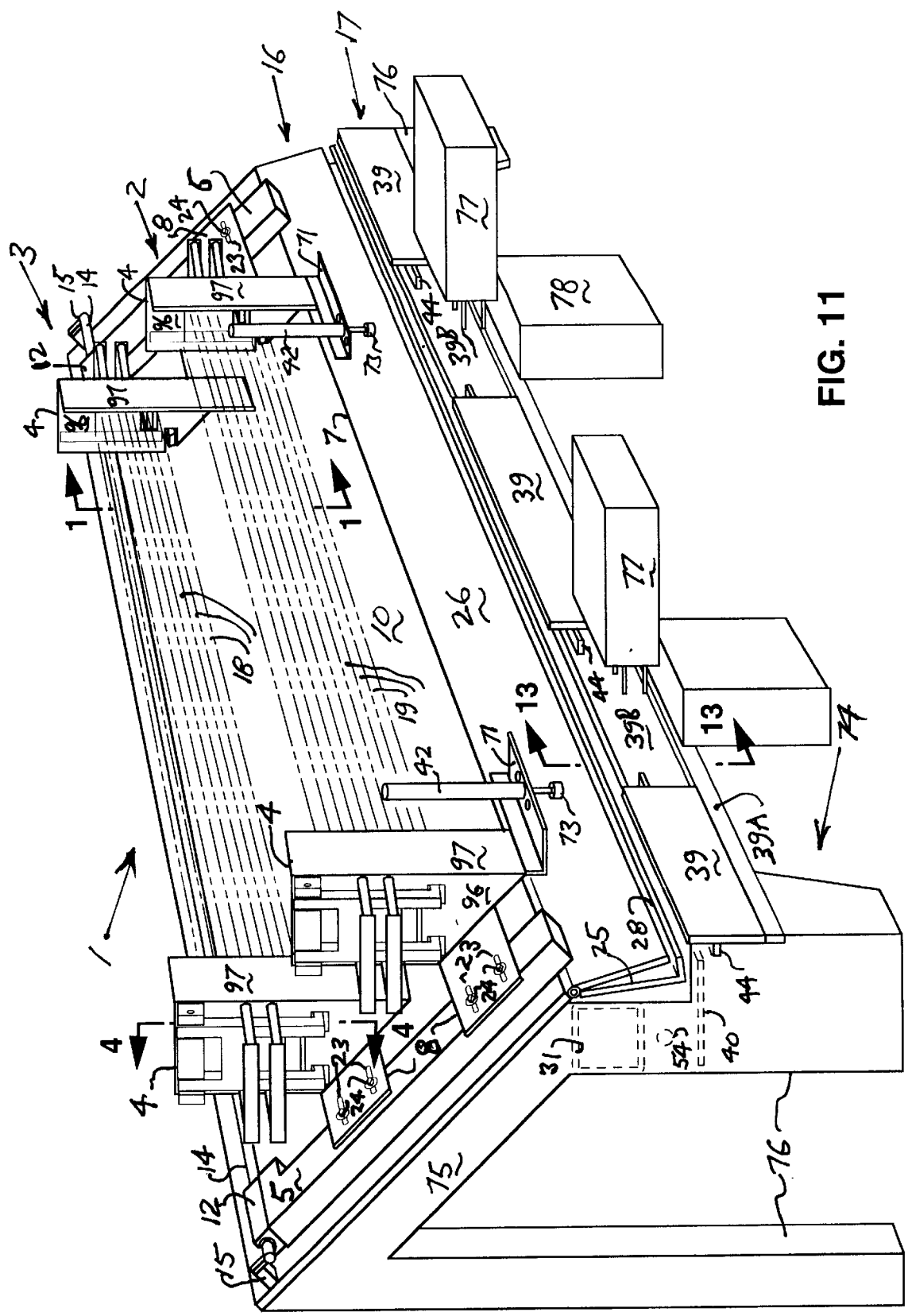
FIG. 11 is an isometric view of an jamb feeder and workstation of this invention.

For an introductory general description of the feeder and it's operation, FIGS. 1 and 11 of the drawings illustrates a feeder 1, comprising dispensers 2 and 3 each comprised of a pair of opposed end supports 4, each end support located at one longitudinal end of its dispenser. The opposed end supports 4 are designed to support the ends of door jambs extending therebetween along the longitudinal dimension of the dispenser. Dispensers 2 and 3 are each mounted at one end on end support frame 5 and on end support frame 6 at the other. Each of frames 5 and 6 is connected to dispensers 2 and 3, respectively, by flanges 8, each flange integral with an end support 4. Dispensers 2 and 3 are arranged in tandem along and above a downwardly sloped pathway 9. Pathway 9 extends in a downward slope in a downstream direction transverse to dispensers 2 and 3 to a downstream end 7 that extends transversely to the downstream direction. In the direction transverse to the downstream direction, pathway 9 extends horizontally a distance equal to the longitudinal dimension of the articles to be dispensed onto and transported along the pathway to side margins that extend in the downstream direction.

Pathway 9 is defined by a floor comprised of slide 10 composed of sheet plywood or metal extending across the pathway (in the direction transverse to the downsterm direction of the pathway) under the dispenser unit end supports 4 at each side and, in the downstream direction, to the downstream end 7 of the pathway. The floor may extend only partially across the pathway and may constitute, for example, two or more narrower slides or the like on either side of the midline between the side margins of the pathway. The floor thus need not be coextensive with the pathway for the articles in the transverse direction, but to provide good lateral support to the articles transported, the floor should comprise slides or other elements positioned at each side of the midline which are desirably located within distance equal to a quarter of the length of the articles to each respective side margin and may extend to each margin.

Frames 5 and 6 each have a linear bearing 12 attached to its upper edge, each bearing engaging a shaft 14 extending across slide 10. Shaft 14 is fixed to frames 5 and 6 by an end support 15. Linear bearings 12 permit lateral movement of frames 5 and 6 for adjustment to the desired lateral location. The frames may then be fixed in place at that location by retention pins (not shown) inserted in the linear bearings.

Feeder 1 is also comprised of a receiver 16 at the lower end of pathway 9 and of slide 10 which forms the transverse sides of pathway 9. Receiver 16 receives each jamb that is dispensed by dispensers 2 and 3 and feeds them individually to a workstation generally designated 17, as will be described in more detail.

A uniform stack of door jambs 18 (shown in dotted outline in FIG. 11), each having the same configuration, including the width of the major planar sides transverse to the longitudinal axis and the thickness between the planar sides, is received in dispenser 3 and held in position at either end by end supports 4. Another stack of door jambs 19, each having the same configuration but different from that of jambs 18, is similarly received in dispenser 2. Jambs 18 and 19 each have a lower face 21 which is to be presented at a workstation by feeder 1 properly oriented for operations to be carried out on the lower face 21 of either of jambs 18 and 19. For this purpose jambs 18 and 19 are each stacked in their respective dispensers 2 and 3, in a uniform orientation with their lower faces 21 positioned so that they will be properly oriented when fed to workstation 17.

As will be discussed in detail, dispensers 2 and 3 are designed to dispense individual jambs, dispensing the jamb from its stack with the longitudinal axis and planar sides thereof in a horizontal plane to drop onto pathway 9 with its respective ends resting on slide 10 with the lower planar side of the jamb resting on each slide. Each dispensed jamb then slides by gravity in the downstream direction down pathway 9 formed by slide 10, with its longitudinal axis transverse to the downstream direction, to receiver 16. Receiver 16 receives each dispensed jamb and deposits it at workstation 17 for assembly or other operations as will be described.

The lowermost margins of end supports 4 are spaced upwardly from slide 10 a distance at least slightly greater than the width dimension of the jambs to be dispensed from dispensers 2 and 3 so that jambs 18 and 19 freely slide under end supports 4 when they are dispensed onto slide 10. To most accurately deposit the articles onto the pathway in the desired attitude, the dispensers 2 and 3 are positioned so that the bottom article to be dispensed is above the pathway a distance no greater than twenty times the thickness of the articles.

By means of the linear bearings on support frames 5 or 6 the end supports 4 of dispensers 2 and 3 at either side of the pathway are adjustable as a unit in the longitudinal direction of the dispensers. Additionally, each end support 4 is adjustable in the longitudinal direction individually. For this purpose flanges 8 are each provided with a slot opening 23 extending in the longitudinal direction of the conveyers through which each respective flange 8 is secured by means of a bolt 24 to frames 5 or 6. Thus, bolts 24 of each dispenser may be loosened for individual lateral adjustment to accommodate a jamb of a different length and then retightened.

Figure 3:
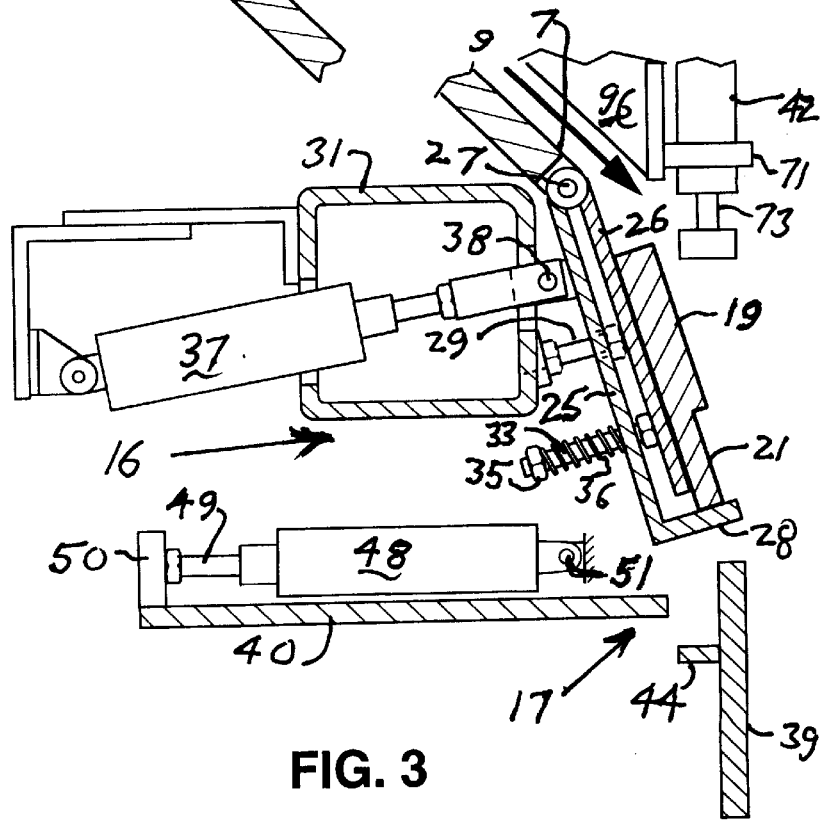
FIG. 3 is another fragmentary view of bottom portion of FIG. 1 illustrating the operation of a receiver of this invention, with a jamb received on the receiver preparatory to feeding the jamb to the workstation.

Receiver 16, as best seen in FIGS. 1, 3 and 11, is comprised of a flap 25 and a kick plate 26 both pivotably mounted parallel to the downstream end of pathway 9 about the same pivot 27 at the lower end of slide 10 and together they serve as a lower extension of pathway 9 defined by slide 10 when pivotally positioned to be in the same plane with the pathway. Flap 25 has a retainer ledge 28 along its lower or downstream margin extending at a right angle therefrom to serve as a stop for a jamb moving down slide 10 and onto receiver 16. Kick plate 26 is slightly shorter in the direction of pathway 9 than flap 25 so that downward edge of kickplate 26 will clear ledge 28 and pivot to a position next to flap 26 and roughly parallel therewith, as shown in FIG. 3. Limit arm 29 mounted on tubular cross beam 31 extends through opening 32 in flap 25 in the direction of kick plate 26 to limit movement of kick plate 26 in the direction of cross beam 31. Bolt 33 is mounted on kick plate 26 and extends through opening 34 in flap 25. Collar 35 at the outer end of bolt 33 is larger than opening 34 and a coil spring 36 mounted around bolt 33 is constrained at the outer end by collar 35 and at the other end by the surface of flap 25 so that spring 36 normally urges bolt 33 and hence kick plate 26 to which it is connected toward flap 25 so that they are next to each other in parallel. Air cylinder 37 is mounted on cross beam 31 and operates through pivot 38 against flap 25 to raise receiver 16 to a position with its surface parallel to that of slide 10 to form an extension thereof, as shown in FIG. 3. With receiver 16 in the raised position, a jamb 18 sliding down slide 10 will be received by it and be retained against ledge 28, again as shown in FIG. 3. Receiver 16 can then be lowered, by operation of cylinder 37, to a position with its top surface to an angle closer to the vertical, as shown in FIG. 1, where limit arm 29 will engage kick plate 26 and urge it away from flap 25 so that jamb 18 will in turn be urged off of receiver 16 to drop from flap ledge 28 to workstation 17 with its planar sides in the vertical plane. As shown, kick plate 26 extends the full length of flap 25 across pathway 9. Alternatively, two or more kick plates of short length but similarly constructed may be spaced along flap 25, each with its own biasing bolt 33 and limit arm 29. Also, a plurality of flap operating cylinders 37 may be distributed along flap 25 to insure efficient operation.

As seen particularly in FIGS. 1, 11, 12 and 13, workstation 17 is a holder in the form of a damping arrangement for holding a workpiece, such as jamb 19, for carrying out desired operations thereon, such as boring screw holes or the like in the workpiece and attaching elements thereto, such as hinges. The clamp comprises jaws consisting of a backstop in the form of anvils 39 and a ram 40 opposed to anvils 39, a locking mechanism 41 for locking ram 40 at its engaged position and overhead cylinders 42. Three anvils 39 mounted on support beam 39A extend along the width of pathway 9, with gaps 39B inbetween, and are positioned to receive jambs from receiver 16 with the lower longitudinal edge 43 of the jamb resting on ledge 44 that projects from the inner wall 45 of each of anvils 39 and the lower face 21 of the jamb resting against inner walls 45 of anvils 39. In this position the lower face 21 of the jamb is exposed at gaps 39B for drilling and other desired operations from the lower face 21 side of the jamb.

Figure 12:
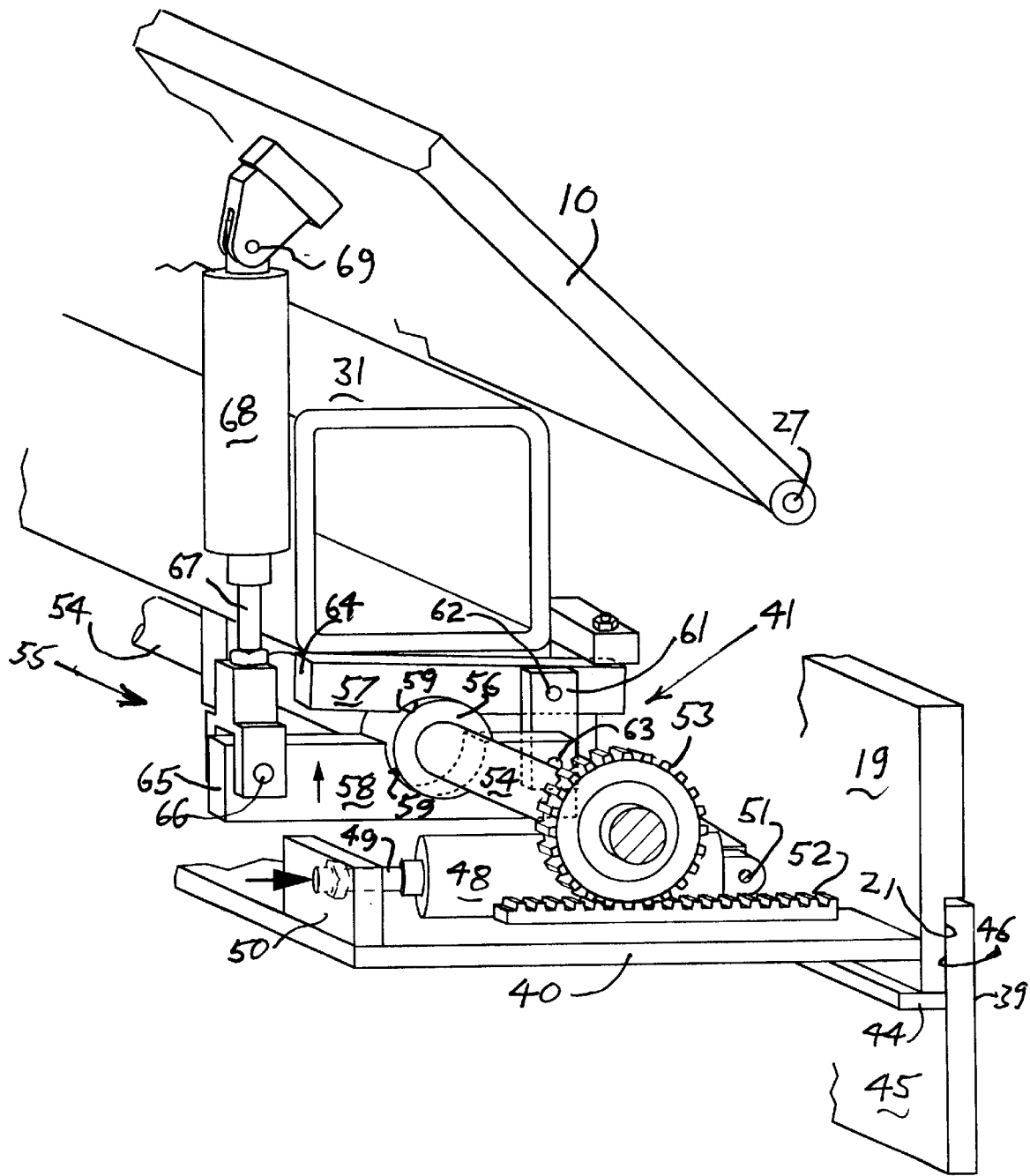
FIG. 12 is a fragmentary view of the feeder shown in FIG. 11 illustrating a jamb clamping ram and the operator and locking mechanism therefor at the workstation.

Ram 40, shown in more detail in FIG. 12, extends the length of pathway 9 30 and is slidably mounted on cross beam 31 by transverse slideways 47, for movement from a rearward disengaged position, as shown in FIGS. 1 and 12, and a forward position engaging jamb 18 positioned against anvils 39, as shown in FIG. 3. Ram 40 has at least one operating cylinder 48, and desirably three spaced along its length, for moving ram 40 between the engaged and disengaged positions. Cylinder 48, which has both push and pull capability, has its operating rod 49 attached to upright ledge 50 on ram 40 at its rearward end. Cylinder 47 extends forward parallel with ram 40 to pivot 51 at its forward end. Pivot 51 secures cylinder 48 to cross beam through an intermediate rigid connector (not shown).

Locking mechanism 41 comprises a rack 52 fastened to ram 40 and extending parallel to cylinder 47 in the direction of movement of ram 40 between the engaged and disengaged positions, a pinion 53 that meshes with rack 52 and is mounted on axle 54 and a brake 55 to stop the rotational movement of axle 54. Brake 55 comprises a circular collar 56 fixed on axle 54 and brake bars 57 and 58, each with semicircular cavity 59 and each receiving a semicircular portion of collar 56 that is less than one-half of its circumference. Brake bars 57 and 58 are connected together by connector link 61 through pivots 62 and 63. Free end 64 of brake bar 57 is constrained against upward movement by cross beam 31 immediately above, by which it is supported. End 65 of brake bar 58 is pivotably attached at pivot 66 to piston rod 67 of cylinder 68 and the other end of cylinder 68 is secured at pivot 69 to the underside of slide 10. Desirably, locking mechanism 41 includes three brakes 55, mounted as described, along ram 40 at spaced intervals over the length thereof across pathway 9, one adjacent each anvil 39, and they are interconnected by axle 54 extending between them so that they operate as a unit for greater rigidity.

Overhead cylinders 42 above anvils 39 are each mounted by flanges 71 to side wall 97 of the respective end support of dispenser 3 with their piston rods 73 extendible downward to abut against the top edge of jamb 19 and thereby secure it against ledge 50 on ram 40, as shown in FIG. 1.

As shown in FIG. 11 feeder 1 and workstation 17 are mounted together as a free-standing unit on a frame which comprises end sections 75, legs 76 and tubular cross beam 31. End sections 75 each abut and are secured to and support respective side ends of slide 10, of cross beam 31 and of support beam 39A for anvils 39 of workstation 17 and each is attached at each of its horizontal ends to the top of a supporting leg 76.

Figure 13:
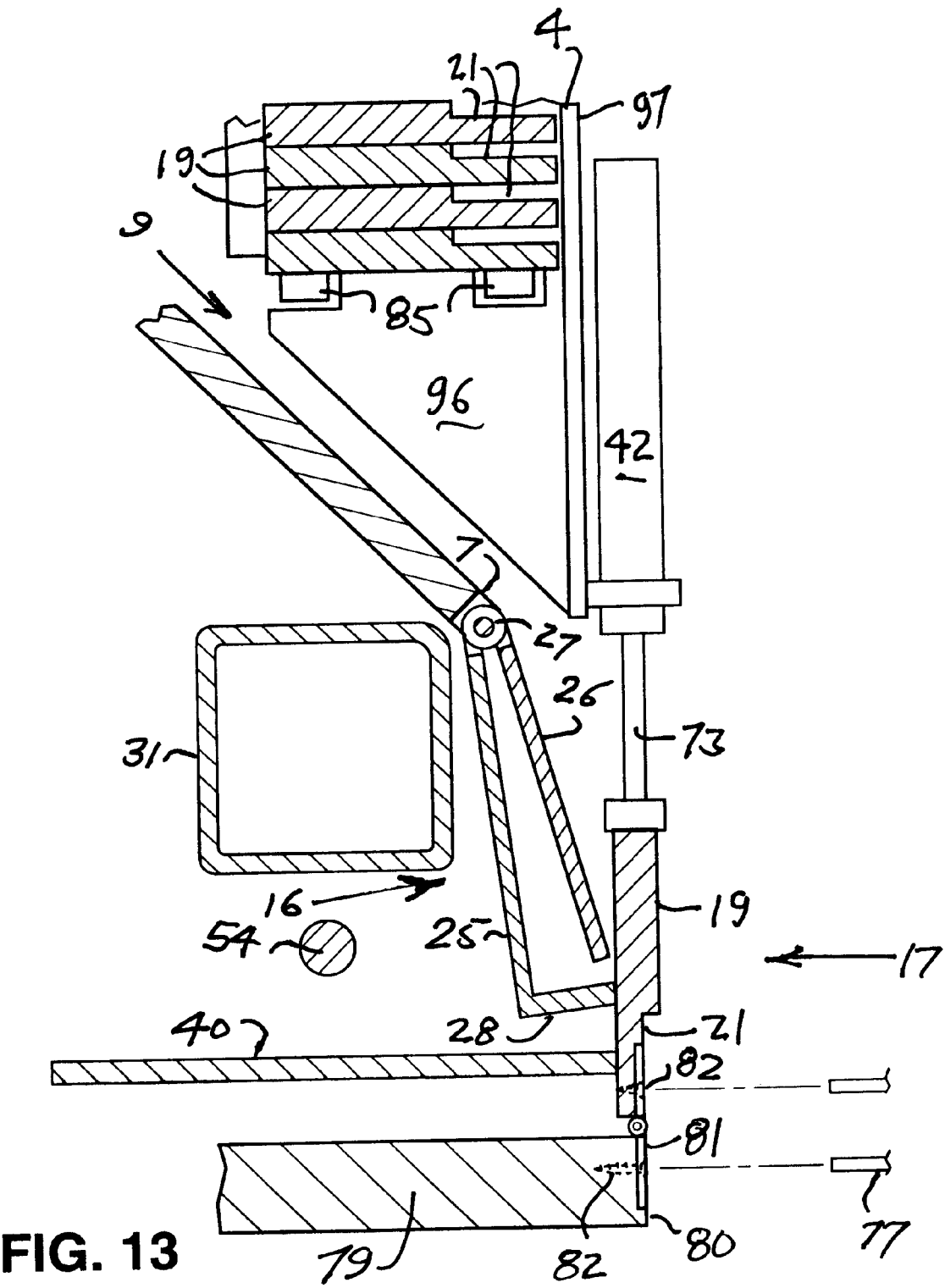
FIG. 13 is a fragmentary cross-sectional view of the jamb feeder and workstation of this invention shown in FIG. 11, taken along line 13—13, illustrating the application of a hinge to the edges of a door and a jamb secured at the workstation.

This embodiment may be utilized for workstation operations that are carried out on the jambs or other articles with semi-automatically with associated processing equipment, such as screwdriving units 77 and hinge feeder units 78, which can be moved into engagement at gaps 39B with the door jamb and associated to apply hinges. As shown in FIG. 13, a door 79 may be positioned below jamb 19 at the workstation with its edge 80 adjacent lower face 21 for application of hinge 81 to edge 80 with screws 82 at the same time for the fabrication of a pre-hung door unit. The desired tools may also be applied manually at this workstation, if desired.

In another embodiment, feeder 1, with legs 76 removed, is mounted above and supported directly on the frame of a machine for automatically applying hinges to doors and jambs and workstation 17 is incorporated as a part of this machine. A preferred machine is that described in U.S. Pat. No. 5,222,290 (Patent '290), the disclosure of which is incorporated herein by reference. As described in Patent '290, the jamb is placed and held in a workstation along side the side edge of the door end for application of hinges connecting the jamb and the door edge by tools mounted on carriages that move longitudinally along the jamb and door edge. In this embodiment feeder 1 is positioned to feed jambs to the workstation of the machine of Patent '290 in the same manner as described above, The workstation of Patent '290, has upstanding members designated there as 8 which are equivalent to anvils 39 herein and cylinders designated there as 26 which clamp the jamb to members 8. In the present embodiment, the novel clamping arrangement of ram 40, including the locking mechanism 41 is substituted for the cylinders designated 26 in Patent '290.

Focusing now on dispensers 2 and 3, while there are two dispensers in the embodiment illustrated, additional dispensers may be employed in tandem along the pathway for the purpose of additionally dispensing yet different articles onto the pathway for movement to the workstation.

Figure 4:
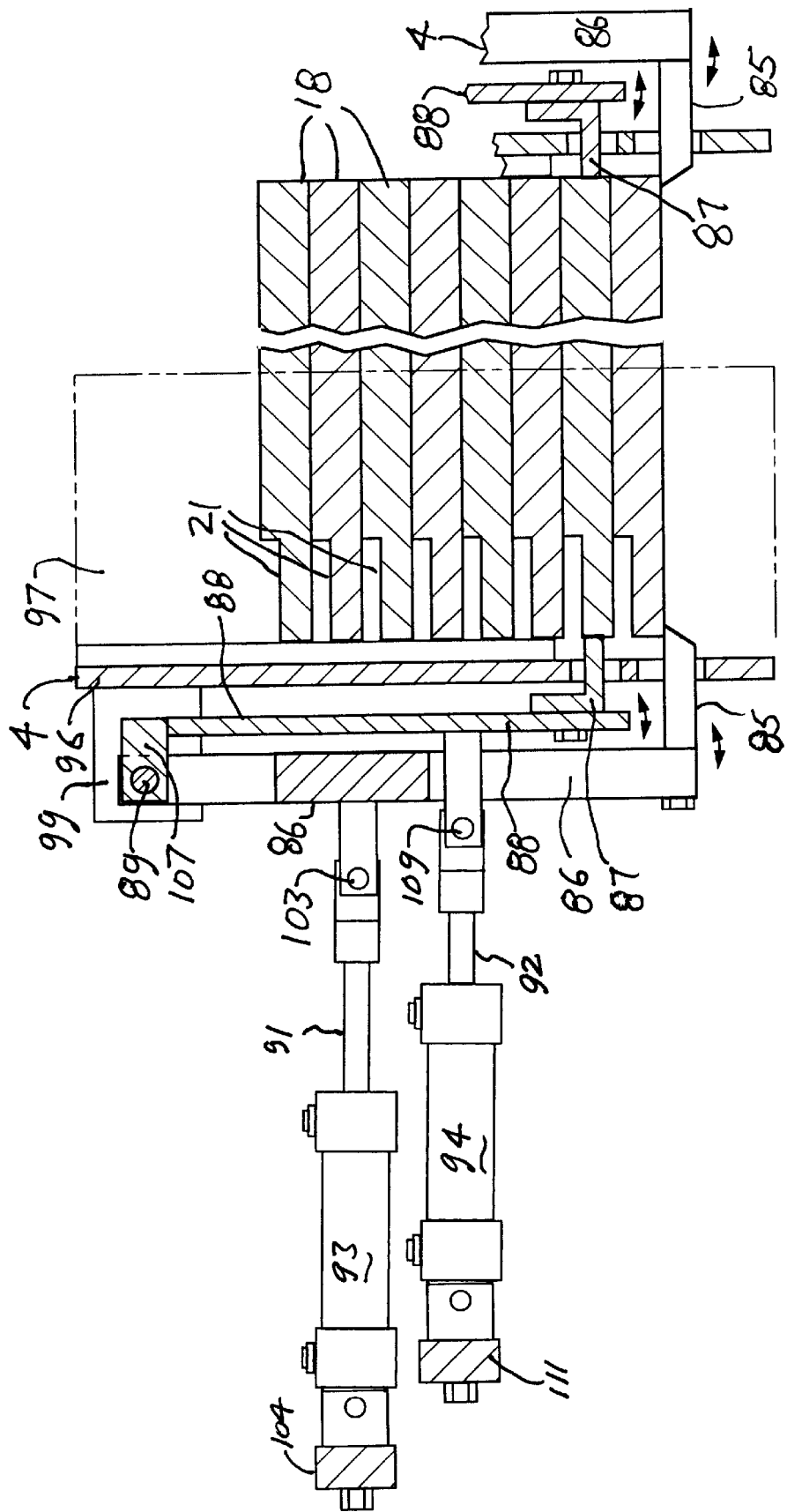
FIG. 4 is a fragmentary, cross-sectional view of the upper jamb dispenser of the feeder shown in FIG. 11 taken along line 4—4 with the longitudinal midportion truncated.
Figure 5:
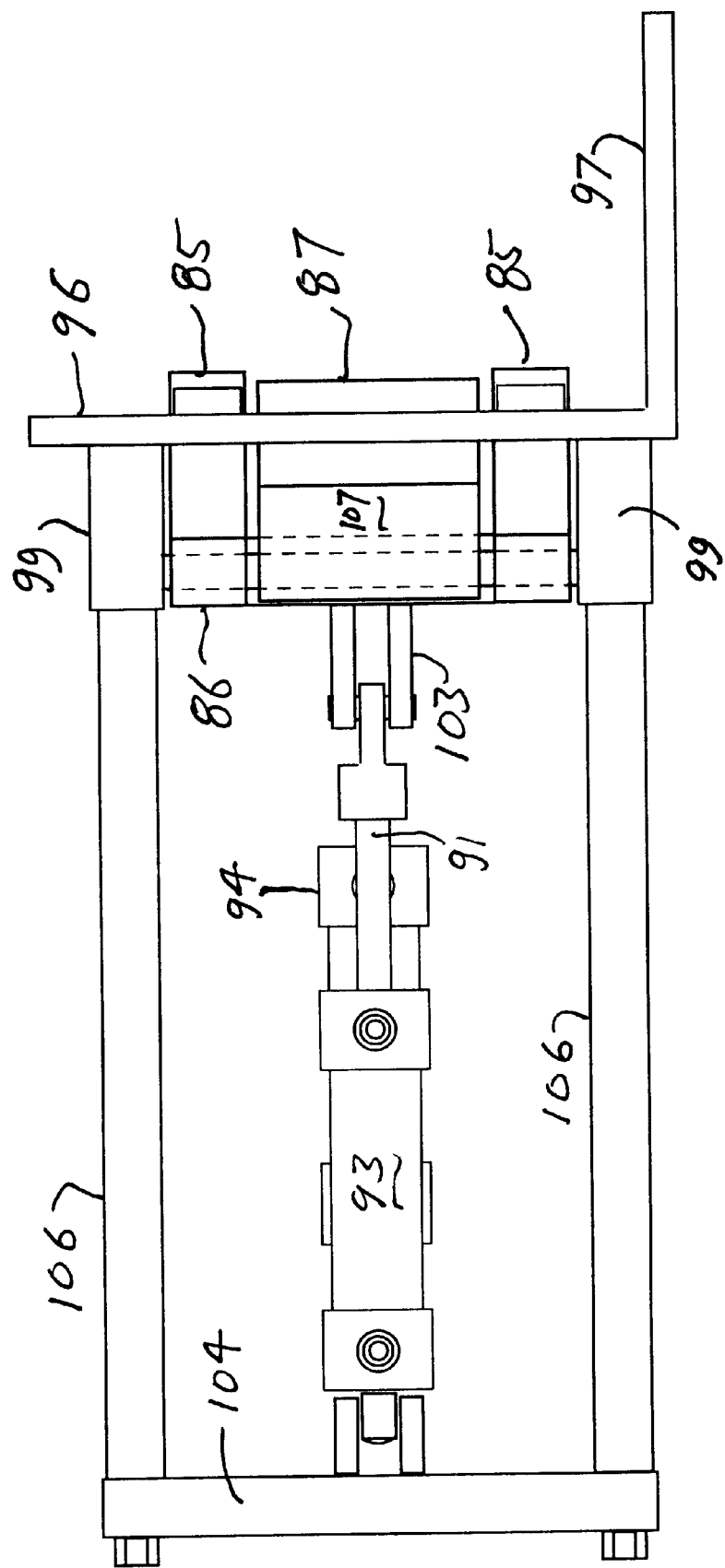
FIG. 5 is a fragmentary top view of FIG. 11 showing the left end support of the lower jamb dispenser.

In overview, each dispenser operates by cooperation of its opposed end supports 4 which support the opposed ends of a stack of articles, here door jambs, having a common length and release the articles individually, one by one, to drop to the pathway below. Referring to FIG. 4, in this view of dispenser 2 a stack of jambs 18 is held between and supported by end supports 4 of the dispenser. Each end of bottom-most jamb is supported by catches 85 extending from a bracket 86. The catches 85 for both end supports 4 are at the horizontal level so that they support a jamb in a horizontal position. Also as shown in this view, a detent 87 extending from a bracket 88 on each of end supports 4 abuts one of opposed ends of the second from the bottom jamb. The detent 87 for both end supports 4 is at the horizontal level so that they support a jamb in a horizontal position.

Brackets 86 and 88 on each end support 4 are mounted on a common pivot rod 89, to move, independently of each, other toward and away from the jamb ends, as indicated by the arrows, at the urging of piston rods 91 and 92 of cylinders 93 and 94, respectively. In operation of the dispenser, piston rod 91 of each end support 4 is normally actuated to urged brackets 86 to their engaged positions as shown in FIG. 4 so that catches 85 are spaced apart a distance less than the length of the jambs so that each is under a respective end of the bottom-most jamb to support the stack of jambs. To dispense a jamb, the second from the bottom jamb is first secured from falling by the use of detents 87 of end each support 4 together as an end-wise clamp on this jamb. Specifically, piston rods 92 are urged to move brackets 88 to the engaged positions shown in FIG. 4, where they engage the ends of the jamb, and to apply sufficient pressure by detents 87 against the ends of the second from the bottom jamb, which they abut, so that jamb and those above it are held from falling. Piston rods 91 are then urged to move brackets 86 to the retracted position where catches 85 are apart a distance greater than the length of the jamb thereby moving catches 85 from under the ends of the bottom-most jamb, whereupon the bottom jamb is free to fall to pathway 9 below the dispenser while the next from the bottom jamb and those above it are held from falling by detents 87 pressing against the jamb ends. After the jamb is thus dispensed, piston rods 91 are urged to move brackets 86 back to the engaged position for catches to receive and support the next jamb. Piston rods 92 are then urged to move brackets 88 away from the jamb ends to the disengaged position, where they are apart a distance greater than the length of the jamb, thereby releasing the stack of jambs to fall to and be retained on the catches of brackets 86 now in the engaged position. In further preparation for repeat the dispensing cycle piston rods 92 are again actuated to return bracket 88 to the engaged position with detents pressed against the respective ends of the jamb now in the second from bottom position.

All end supports 4 of dispensers 2 and 3 are similarly constructed and their details of construction may be described by reference to FIGS. 5 through 10. Each end support is composed of an L-shaped housing 95 having a back wall 96, that supports brackets 86 and 88 and their associated operating cylinders, and a side wall 97 on the downstream side that cooperates with backwall 96 to act as a guide to assist in aligning and providing side support for the stack of jambs on the dispenser. Referring now to FIGS. 7 and 8, bracket 86 has an "H" configuration with arms 98 mounted by pivot rod 89 to tabs 99 on the back side of wall 96. Each of legs 101 of bracket 86 bears a catch 85. Back wall 96 has a pair of openings 102 through which catches 85 extend when bracket 86 is moved to the engaged position. As shown also in FIG. 5, piston rod 91 of cylinder 93 is secured to the back side of bracket 86 by pivot connection 103. Cylinder 93 is mounted on cross beam 104 of yoke 105 having rods 106 by which yoke 105 is mounted on the back side of wall 96. Retraction of piston rod 91 moves bracket 86 to the disengaged position with catches 85 positioned to the rear of wall 96. Extension of piston rod 91 moves bracket 86 to the engaged position with catches 85 protruding through openings 102 to the front of wall 96 where they will support the end of a stacked jamb, as shown in FIG. 4.

With reference to FIGS. 9 and 10, bracket 88 is a plate narrow in the vertical direction and is mounted on pivot rod 89 at offset block 107 and is located centrally along pivot rod 89 between the arms 98 of bracket 86. Detent 87 is secured at the bottom of bracket 88 for movement into and through opening 108 in back wall 96. With bracket 88 in its retracted position, detent 87 is retracted into and to the rear of opening 108. When bracket 88 is in the engaged position, detent procures through and to the front of wall 96 into engagement with the jamb end. Detent 87 is positioned in the vertical direction a distance above catches 85 to be above the end of the lowest jamb, so that it may be released by disengaging catches 85, and to abut the end of the next from bottom jamb in the stack for clamping it against the opposed detent on the other end support of the dispenser.

As best seen in FIG. 4, the pivot connection with offset block 107 offsets bracket 88 from bracket 86 a distance toward wall 96 to provide room for pivotal movement of bracket 88 between an engaged and a retracted position even with bracket 86 in the engaged position.

As shown in FIGS. 5, and 9–11, piston rod 92 of cylinder 94 is secured to the back side of bracket 88 by pivot connection 109. Cylinder 94 is mounted on cross beam 111 of yoke 112 having rods 113 by which yoke 112 is mounted on the back side of wall 96. Retraction of piston rod 92 moves bracket 88 to the disengaged position with detent 87 retracted into opening 108. Extension of piston rod 92 moves bracket 88 to the engaged position with detent 87 protruding through opening 108 to the front of wall 96 where it will engage the end of the second from the bottom jamb, as shown in FIG. 4.

In operation of the workstation feeder of this invention, the lateral locations of the end supports of dispensers 2 and 3 are first adjusted as appropriate so that the gaps between the opposed end supports of each dispenser will fit the length of the jambs to be dispensed and so that the jambs are dispensed at the desired longitudinal location to move down pathway 9 to the longitudinal position along workstation 17 to which they are to be fed. For application of a door hinge to the jamb and an adjacent door, this will be the lateral location for proper longitudinal register between the door and jamb as well as for register with a gap 39B between anvils 39, for access of tools. As previously described, this is done by adjusting the relative positions of connecting bolts 24 along the slot openings 23 and by adjusting the positions of linear bearings 12 along the horizontal legs 13 of frames 5 and 6. The jambs are then stacked in each dispenser with the proper orientation so that the lower face 21 to be worked upon will be fed to workstation 17 with lower face presented for the work to be performed on them. The dispensers may then be operated, as described above, to dispense jambs in succession from either or both In any case a single jamb will be dispensed and fed to workstation 17 before the next jamb is dispensed from either dispenser. Typically dispensers 2 and 3 will be operated alternatively to dispense a single jamb so that jambs so that jambs 18 and 19 will be fed in succession alternatively to workstation 17. Each jamb moves downstream along pathway 9 and is consecutively received and deposited on workstation 17 by receiver 16 as previously described. Upon deposition of a jamb at workstation 17, cylinder 47 for ram 40 is operated to clamp the jamb against anvils 39. Cylinders 68 for brakes 55 of locking mechanism 41 are then operated to lock ram 40 in place. After completion of the work on the jamb, locking mechanism 41 is released and ram 40 retracted. The completed jamb is then removed from the workstation either manually or mechanically and feeder 1 and workstation 17 are ready for the next cycle.

An advantageous feature of the embodiment described is the simplicity and efficiency of utilizing a pathway 9 that has a downward slope to receiver 16, desirably at least 30 degrees from the horizontal, and preferably between 30 to 60 degrees, so that the dispensed articles are propelled by gravity to receiver 16. However, in the broader scope of the invention, if desired, the pathway may have a less degree of slope or even be horizontal. However, in that mode an auxiliary propelling force for the dispensed articles will be necessary. This may take the form of conveyor belts or chains, such as a single belt completely across the pathway or two synchronized belts, one extending down slide 10 and the other down slide 11 to receiver 16.

As can be seen, the feeder of this invention is particularly suitable for feeding elongated workpieces having opposed generally planar surfaces along their longitudinal axis to a clamp at the workstation that secures the article along its length with the planar surfaces workface in a generally vertical plane for work operations to be carried out on a workface at one of the planar surfaces. The workpieces can be stacked on one or more dispensers, such as dispensers 2 and 3, each with its workface bearing surface upward and then dispensed sequentially to the pathway 9 on their opposed planar sides and moved to receiver 16, which rotates to deposit each article in turn in into the clamp with its planar surfaces generally vertical and the workface presented for work operations at the workstation.

What is claimed is:

1. Apparatus for feeding stackable articles which are elongated and have opposed planar sides along a longitudinal axis to a workstation for processing which comprises:

a. a pathway for delivering the elongated articles in a downstream direction to a downstream end of the pathway, when deposited thereon by an article dispenser with their longitudinal axis transverse to the downstream direction, the pathway, transverse to the downstream direction, being horizontal and extending to side margins in each transverse direction over a distance equal to the length of the articles to be delivered, b. a plurality of article dispensers in tandem in the downstream direction along the pathway, each dispenser being adapted to individually dispense articles downwardly therefrom onto the pathway with one of the planar sides abutting the pathway, being disposed above the pathway a distance to permit articles deposited on the pathway to move thereunder along the pathway and being arranged with respect to the pathway to dispense elongated articles onto the pathway with the longitudinal axis transverse to the downstream direction of the pathway and in the horizontal plane, and c. a receiver at the downstream end of the pathway for receiving articles moving downstream on the pathway and delivering each individually to the workstation, and wherein the pathway extends at a downward angle from the horizontal in the downstream direction from below the dispensers to the downstream end of the pathway, whereby articles dispensed on the pathway from the dispensers are propelled by gravity to slide down the pathway to the receiver.

2. Apparatus as in claim 1 and wherein the workstation comprises a clamp having opposed jaws, the clamp having an open position at which the jaws have an opening therebetween that extends transversely to the downstream direction of the pathway to receive an article, fed thereto by the receiver, with the longitudinal axis thereof in the horizontal plane and with the planar sides thereof in substantially the vertical plane, the jaws being movable from the open position to a closed position to damp the article therebetween, and the receiver is adapted to deposit the elongated articles into the opening between the jaws of the clamp at the open position.

3. Apparatus as in claim 1 and wherein the pathway comprises a floor extending, in the downstream direction, from below the dispensers to the downstream end of the pathway and, in the directions transverse to the downstream direction, extending at each side of the midline between the side margins of the pathway toward the respective side margin and extending, in the downstream direction, from below the dispensers to the downstream end of the pathway.

4. Apparatus as in claim 3 and wherein the floor comprises at least one slide at each side of the midline between the side margins of the pathway extending within a distance equal to one quarter of the length of the articles to be conveyed to the respective side margin.

5. Apparatus as in claim 1 and wherein downstream end of the pathway is transverse to the downstream direction and the receiver comprises a flap having a longitudinal axis parallel to the downstream end of the pathway and an upper surface extending to a downstream margin in the downstream direction, the flap being pivotably mounted about an axis adjacent to and parallel with the downstream end of the pathway for rotation from a receiving position, where the upper surface of the flap extends in substantially the same plane as the adjacent pathway, to a release position where the upper surface extends at an angle closer to the vertical plane, a stop at the downstream margin for retaining on the flap articles fed thereto from the pathway and release means for releasing an article from the stop when the flap is in the release position, whereby to release the article from the flap with the planar sides thereof in substantially the vertical plane, and wherein the workstation is at a position adjacent to and below the downstream margin of the flap when the flap is at the release position to receive an article released from the plane with the planar sides of the article in the vertical plane.

6. Apparatus as in claim 5 and wherein the workstation comprises a clamp having opposed jaws, the clamp having an open position at which the jaws have an opening therebetween that extends transversely to the downstream direction of the pathway to receive an article, fed thereto by the receiver, with the longitudinal axis thereof in the horizontal plane and with the planar sides thereof in substantially the vertical plane, the jaws being movable from the open position to a closed position to clamp the article therebetween and wherein the clamp is positioned relative to the downstream margin of the flap, when the flap is at the release position, to receive in the opening between the jaws an article released from the flap, with the planar sides of the article in the vertical plane.

7. Apparatus as in claim 1 and wherein the pathway extends at a downward angle of at least 30 degrees from the horizontal in the downstream direction.

8. Apparatus as in claim 7 and wherein the pathway extends at a downward angle of no more than 60 degrees from the horizontal in the downstream direction.

9. Apparatus as in claim 7 and wherein each dispenser comprises means for supporting a stack of articles which are elongated, have opposed planar sides in the longitudinal direction, a common thickness between the planar sides and a common length with the longitudinal axis of the articles in a horizontal plane, the supporting means comprising an end support at each end of the stack for supporting the respective end of the stack, means for dispensing articles individually downwardly from the stack to the pathway with the longitudinal axis of each article at a horizontal attitude.

10. Apparatus as in claim 9 and wherein each dispenser is positioned above the pathway so that the bottom article in the stack supported by the dispenser is spaced above the pathway a distance no greater than twenty times the thickness dimension of the articles.

11. Apparatus as in claim 9 and wherein, each end support of each dispenser has a bottom article catch for supporting a respective end of the bottom article in the stack, the catches being opposed and at the same horizontal level, a detent for supporting a respective longitudinal end of the next to bottom article in the stack, the detents being opposed and at the same horizontal level a distance above the level of the catches at least equal to the common thickness dimension of the articles, the catches being movable from an end support position at which the distance between the opposed catches is less than the common length of the articles to a release position at which the catches are spaced apart a distance greater than the common length of the articles and the detents are movable from an end support position where they engage the respective ends to a release position where they are spaced apart a distance greater than the common length of the articles, means for moving the catches and the detents between their respective end support positions and release positions, whereby the articles may be stacked horizontally on the end supports when the catches are in their support positions and the detents are in their release positions and the stacked articles individually dispensed by first moving the detents to their support positions with the second from bottom article, then moving the catches simultaneously to their release positions to dispense the bottom article with its longitudinal axis at a horizontal attitude, then, in preparation for the next dispensing cyle, moving the catches back to their support positions and then moving the detents back to their release positions to drop the formerly next to bottom article and the stacked thereon down to be supported directly by the catches.

12. Apparatus for feeding stackable articles which are elongated and have opposed planar sides along a longitudinal axis to and securing them at a workstation for processing which comprises:

a. a pathway for delivering the elongated articles in a downstream direction to a downstream end of the pathway, when deposited thereon by an article dispenser with their longitudinal axis transverse to the downstream direction, the pathway, transverse to the downstream direction, being horizontal and extending to side margins in each transverse direction over a distance equal to the length of the articles to be delivered, b. a plurality of article dispensers in tandem in the downstream direction along the pathway, each dispenser being adapted to individually dispense articles downwardly therefrom onto the pathway with one of the planar sides abutting the pathway, being disposed above the pathway a distance to permit articles deposited on the pathway to move thereunder along the pathway and being arranged with respect to the pathway to dispense elongated articles onto the path way with the longitudinal axis transverse to the downstream direction of the pathway and in the horizontal plane, c. a receiver at the downstream end of the pathway for receiving articles moving downstream on the pathway and delivering each individually to the workstation and d. a workstation in position to receive articles delivered individually from the receiver and comprising a holder for securing the article in position for operations to be carried out on the article at the workstation.

13. Apparatus as in claim 12 and wherein the holder at the workstation is adapted to receive and hold each of the articles with its longitudinal axis extending transversely of the downstream direction of the pathway.

* * * * *